United States Patent [19]
Nakao et al.

[11] Patent Number: 5,929,603
[45] Date of Patent: Jul. 27, 1999

[54] APPARATUS FOR PREVENTING OVER-DISCHARGE

[75] Inventors: Fumiaki Nakao, Kosai; Tetsuya Suzuki, Aichi-ken; Katsuo Yamada, Kosai; Shoichi Wakao, Hamamatsu; Kozi Ohishi, Kosai, all of Japan

[73] Assignee: FDK Corporation, Tokyo, Japan

[21] Appl. No.: 08/791,045

[22] Filed: Jan. 28, 1997

[30] Foreign Application Priority Data

Feb. 5, 1996 [JP] Japan ..................................... 8-018509

[51] Int. Cl.⁶ ....................................................... H02J 7/00
[52] U.S. Cl. ........................ 320/136; 320/134; 320/116; 320/118
[58] Field of Search ..................................... 320/135, 136, 320/134, 116, 118; 324/429, 433, 434; 429/90, 91, 92, 93; 307/10.7

[56] References Cited

U.S. PATENT DOCUMENTS

| | | | |
|---|---|---|---|
| 4,493,001 | 1/1985 | Sheldrake | 320/135 |
| 5,159,257 | 10/1992 | Oka | 320/136 |
| 5,296,997 | 3/1994 | Betton et al. | 320/136 |
| 5,332,958 | 7/1994 | Sloan | 320/136 |
| 5,493,197 | 2/1996 | Eguchi et al. | 320/116 |

*Primary Examiner*—Peter S. Wong
*Assistant Examiner*—K. Shin
*Attorney, Agent, or Firm*—Evenson, McKeown, Edwards & Lenahan, P.L.L.C.

[57] ABSTRACT

An over-discharge prevention apparatus comprising:

a voltage detection device 2 for detecting electric voltages of both ends of a electric storage element (B) and outputting a discharge finishing signal (PFD) when a discharge extinction voltage (VL) is detected;

a discharge controlling device 3 for delaying the detected output of the voltage detection device 2 for a predetermined time (Td); and a switching device 1 connected in series with the electric storage element (B), the switching device being set to an OFF state by a delay signal of the discharge controlling device.

2 Claims, 3 Drawing Sheets

APPARATUS FOR PREVENTING OVER-DISCHARGE

BACKGROUND OF THE INVENTION

The present invention relates to an apparatus for preventing over-discharge in various kinds of accumulator elements such as a secondary battery, primary battery and large-scale capacitors, etc. and, more particularly, to the over-discharge prevention apparatus which can improve utilization efficiency for the storage elements and to prevent erroneous (wrong) operation, that is, malfunction, at the time the electric power from the accumulator elements is cut to the electric and electronic apparatuses and instruments.

Conventionally, a battery package mounts therein secondary batteries as a power source for a portable electronic instrument and an auxiliary power system for electronic instruments and apparatus. The battery package is provided with an over-discharge prevention mechanism as well as an over-charge prevention mechanism so that troubles such as degradation of battery properties and/or leakage of a battery liquid at the time of over-consumption of the installed batteries can be prevented.

FIG. 5 shows a block diagram of a typical structure of the conventional over-discharge prevention mechanism, which is generally composed of a voltage detector 2 for monitoring an electric voltage of the battery and a switching portion 1 connected in series with batteries B1 and B2 (in an example of two cells connected in series) between terminals T1 and T2. When the battery voltage falls below a discharge extinction voltage, the voltage detector 2 is driven to switch OFF the switching portion 1 to thereby stop the electric supply to electronic apparatuses and instruments.

However, with respect to electronic apparatuses and instruments such as personal computers and digital portable telephone instruments which require data processing, the data in the process or are destroyed when the power supply is stopped due to the over-discharge detection.

Therefore, these electric apparatuses and instruments have been provided with a power source detection mechanism so that the remaining battery remanent voltage is assumed from a voltage value VT of the power source in the battery package to judge in advance the state of battery consumption, and then an operation of the electronic apparatuses and instruments are accurately stopped before the battery output is cut off so that the data and information are reliably saved and protected.

However, since the judgment of the battery consumption is generally provided with some marginal regions in order to reliably stop the operation of the electronic apparatuses and instruments so that the electronic apparatuses and instruments are stopped even when the remaining capacity of the battery is fully within the usable region, it has been difficult to take out the battery capacity of the battery package to a maximum extent.

In addition, in the battery package of the illustrated example of FIG. 5 in which a plurality of battery cells Bl, B2, ( . . . Bn) are connected in series, the balance of cell voltages V1, V2, ( . . . Vn) is detected by the voltage detectors M1, M2, ( . . . Mn), respectively, and a logical sum (logical OR) of the detected outputs drives the over-discharge prevention mechanism to cut off the power supply and. Accordingly, it has been quite difficult to externally judge accurately the consumption of the battery. Therefore, a voltage margin of the voltage detection in the electronic apparatuses and instruments is inevitably further increased, with the result that an efficiency of the consumption or usage is further degradated.

SUMMARY OF THE INVENTION

An object of the present invention is to provide an improvement for solving the disadvantages of the conventional mechanisms.

Another object of the present invention is to provide a new and reliable over-discharge prevention apparatus which permits safety of the data and information of external electronic apparatuses and instruments at the time of an extinction voltage of the batteries and, improvements in utilization efficiency of the batteries.

According to the present invention, there is provided an over-discharge prevention apparatus comprising:

voltage detection means for detecting electric voltages at the ends of an electric storage element (B) and outputting a discharge finishing signal (PFD) when a discharge finishing voltage (VL) is detected;

discharge controlling means for delaying the detected output of the voltage detection means for a predetermined time (Td); and switching means connected in series with the electric storage element (B), the switching means being set to an OFF state by a delay signal of the discharge controlling means.

According to another aspect of the present invention, there is provided an over-discharge prevention apparatus comprising:

voltage detection means for detecting electric voltages at the ends of an electric storage element (B) and outputting a discharge finishing signal (PFD) when a discharge finishing voltage (VL) is detected;

remote controlling means for effectuating external power cut-off signal (RST) after the discharge finishing signal (PFD) is outputted; and switching means connected in series with the electric storage element (B), the switching means being set to an OFF state by an OFF output signal (S1) of the remote controlling means 4.

In the present invention, secondary batteries, primary batteries and large-scaled capacitors can form the electric storage elements (B).

PREFERRED EMBODIMENT OF THE INVENTION

A preferred embodiment of the invention will be described with reference to the accompanying drawings.

Figure 1:
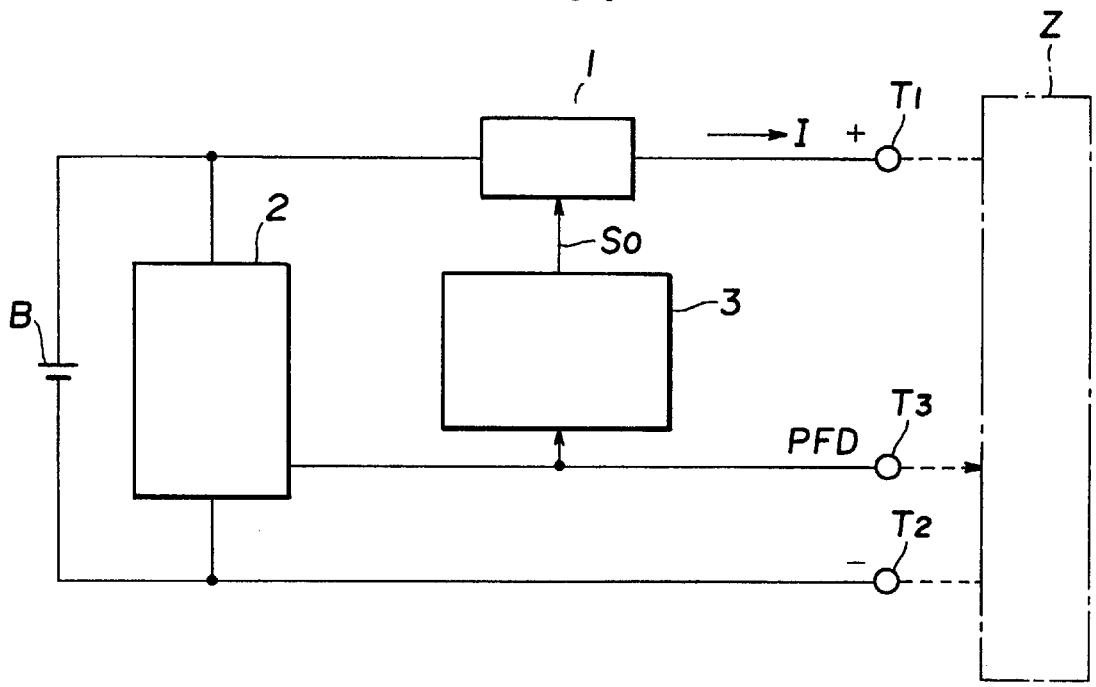
FIG. 1 is a block diagram of a typical structure of a battery package provided with an over-discharge prevention apparatus of the present invention.

Referring first to FIG. 1, a secondary battery B mounted within a battery package has a positive electrode (+)

connected, through a switching portion 1, with a power source terminal T1, and a negative electrode (−) connected to a ground terminal T2. Through the terminals T1 and T2, electric power is supplied to external electric apparatuses and instruments.

A voltage detector 2 is provided for detecting a voltage of the battery B. An output side of the voltage detector 2 is connected with a discharge controller 3 and also connected with a terminal T3 as an electric line for a discharge finishing signal PFD for the external apparatuses and instruments. The discharge controller 3 is composed mainly of a delay circuit for delaying a detected output of the voltage detector 2, and its output side provides a delay output signal S0 connected with an input side of the switching portion 1.

Figure 4:
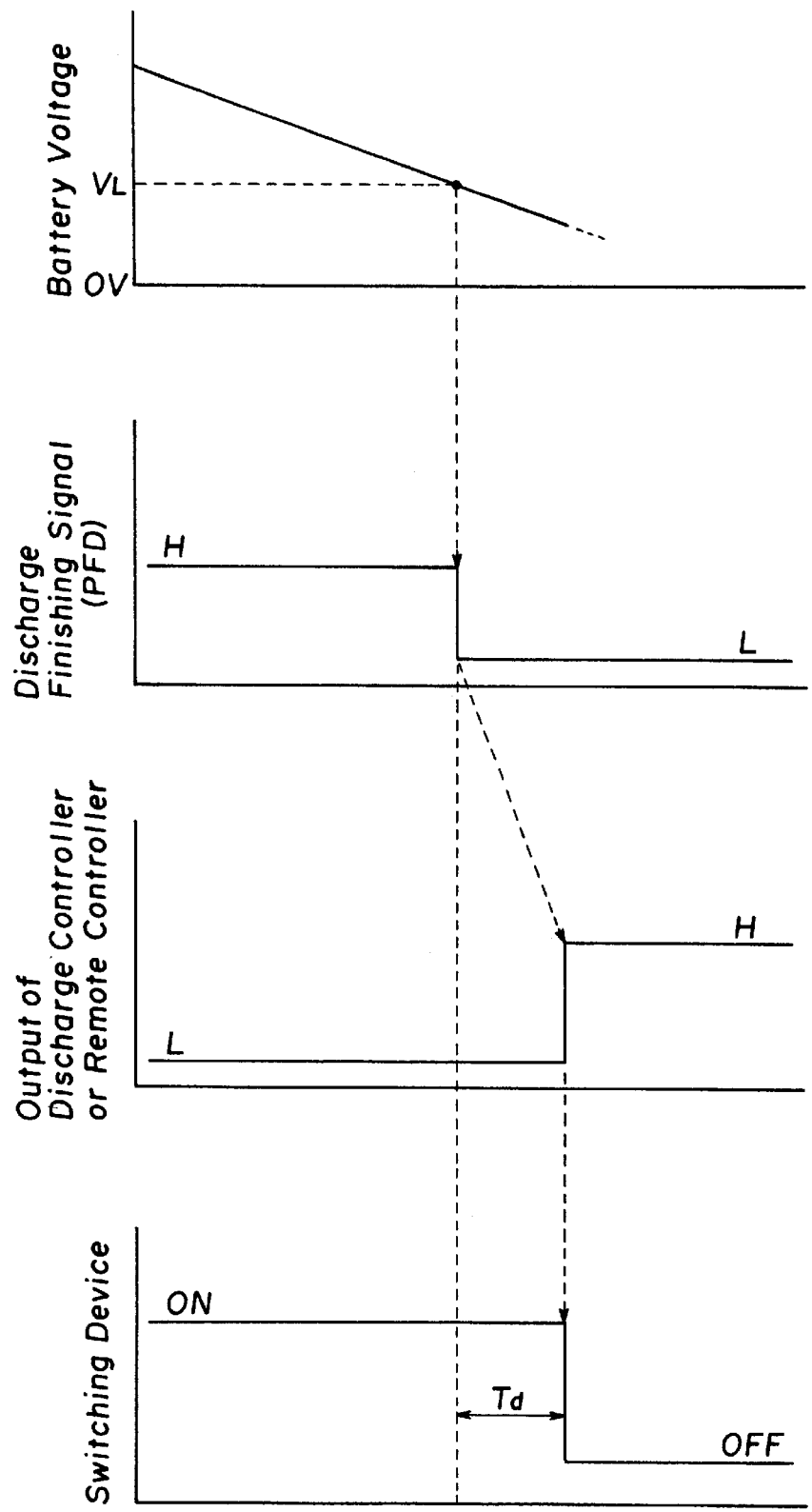
FIG. 4 is an operational timing diagram of the over-discharge prevention apparatus shown in FIG. 3.

An operating mode of the apparatus according to the first embodiment of FIG. 1 will be described with reference to the timing diagram of FIG. 4. First, when the external apparatuses and instruments Z are connected to each of the connectors T1, T2, T3 of the battery package, discharge of the battery B starts and, at this moment, if the battery voltage is above the discharge finishing voltage VL (that is, a limited voltage for finishing the discharge), the voltage detector 2 maintains its inoperative state, and the switching portion 1 is turned into its ON-state by its output so that a discharge current I is supplied to the external apparatuses and instruments Z through the terminals T1, and T2. The external apparatuses and instruments Z always monitor the state and conditions of the battery via the electric line for the discharge finishing signal PFD transmitted through the terminal T3.

As the discharge continues, the battery voltage gradually lowers. When the battery voltage becomes lower than the discharge finishing voltage VL, the voltage detector 2 is driven to output a discharge finishing signal PFD. When the external apparatuses and instruments receive an ON-state of the discharge finishing signal PFD, the external apparatuses and instruments judge the battery to be in a used-up consumed or state and therefore begin stopping the operation of the external apparatuses and instruments.

On the other hand, the over-discharge detection output is delayed for the predetermined time Td at the discharge controller 3 and its delay output signal S0 will make the switching portion 1 of the next stage change to an OFF state and then the electric power supply to the external apparatuses and instruments Z is stopped after the predetermined delay time Td from the over-discharge detection.

The delay time Td is used for the purpose of not only prevention of incorrect or wrong operation of the over-discharge detection due to a pulsating load current, but also to obtain an execution period for stopping the operation. For example, in digital portable telephones, the delay time Td is set to be some milli-seconds (msec.) and more, and in personal computers and work stations the delay time Td is set to be in the range of from some hundred milli-seconds to some tens of milli-seconds for the purpose of saving the data and information into a hard disc device. In all cases, the delay time Td is extremely small such as several tens of milli-seconds at maximum as described above whereas the battery discharge time is as long as one hour to six hours and, therefore, the battery can be prevented from being over-discharged and stressed by a surge current during the delay time Td having such a short period of time.

Figure 5:
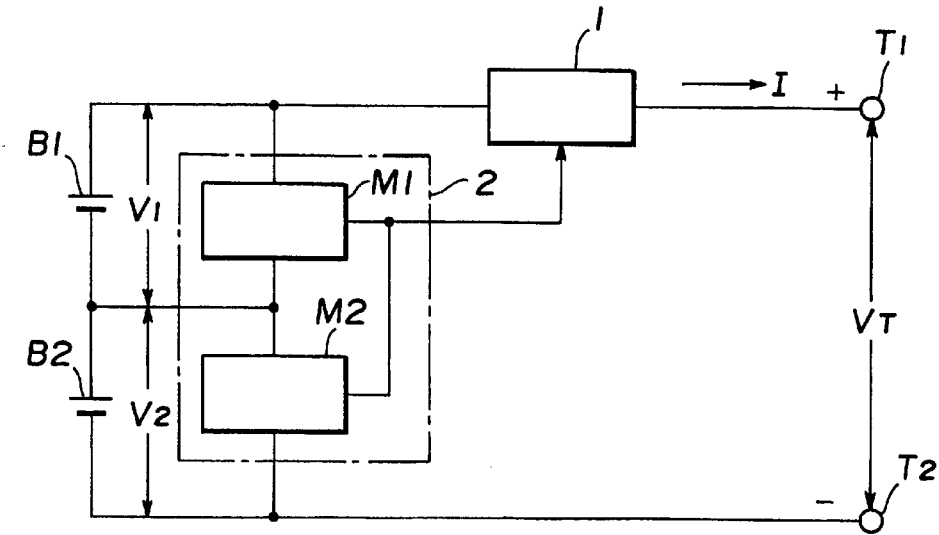
FIG. 5 is a block diagram of the conventional prior art structure of a battery package provided with the conventional over-discharge prevention apparatus.

Although the first embodiment described above uses a single-cell structure as the battery B, the present invention is not limited to the embodiment, but also a multi-cell structure as shown in the conventional apparatus of FIG. 5 can be applied. In the multi-cell structure, the voltage of each battery cell is detected and a logical sum (OR operation) of its detected output provides an over-discharge output of the battery package. Thus, since it is possible to alarm the finishing of discharge of the battery from the side of the battery package, the discharge finishing voltage can be set to a usage limitation value and, therefore, the remaining capacity of the battery can be taken out and used up effectively.

In the first embodiment described above, the execution period for stopping the operation of the external apparatuses and instruments Z is set in advance to be the delay time Td in the battery package. However, the various execution periods of the stopping operation are different from one another in their types and kinds of the external apparatuses and instruments Z, and also in their operational modes. Therefore, it will be difficult to set a suitable time in accordance with each apparatus and instrument. Additionally, setting only the battery package sometimes provides difficulties in application to the external apparatuses and instruments.

Figure 2:
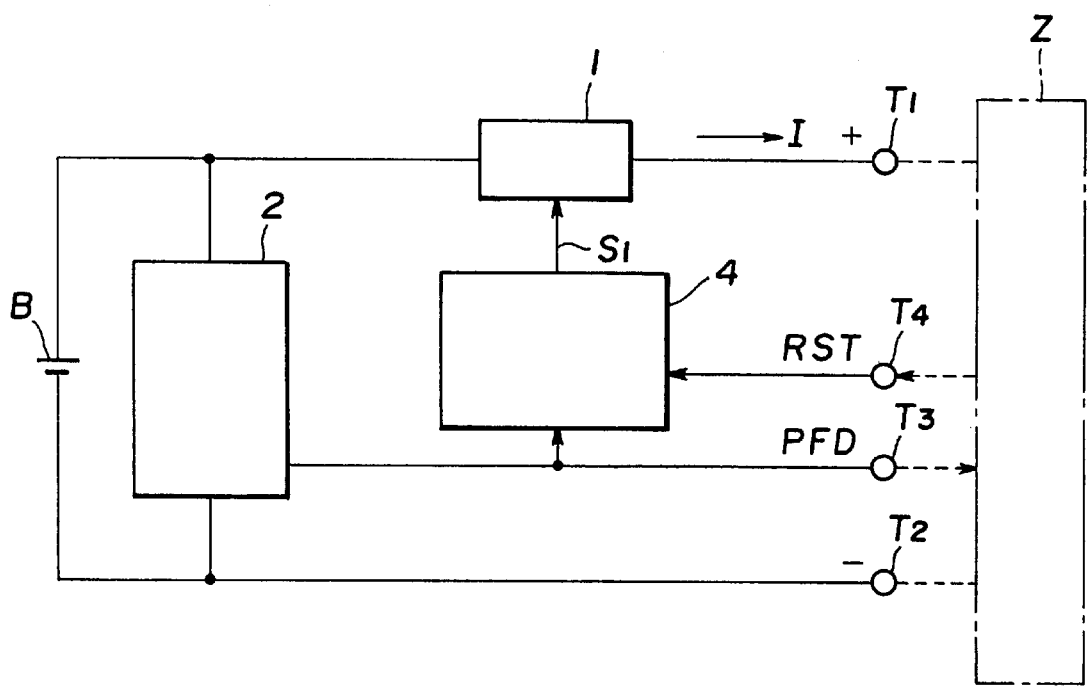
FIG. 2 is a block diagram of a battery package structure with an over-discharge prevention apparatus according to another embodiment of the present invention.

In view of the above reasons, the invention is extended to a second embodiment shown in FIG. 2 in which the stopping operation execution period is more accurately matched with the delay time Td. In FIG. 2, the apparatus has the voltage detector 2 for monitoring the voltage of the battery B, a switching portion 1 for switching ON/OFF a discharged current I, and a remote controller 4 for controlling an ON/OFF state of the switching portion 1. As an electric signal line for transmitting and receiving signals to and from the external apparatuses and instruments Z, a wire for a power source cutting-out signal RST from the external apparatuses and instruments is provided in addition to the wire for the discharge finishing signal PFD from the aforementioned battery package, and the input line of the discharge finishing signal PFD is connected to an input side of the remote controller 4 through the terminal T3.

In the second embodiment of the invention, the remote controller 4 is operated so that the power cutting-out signal RST becomes effective when the discharge finishing signal PFD is output. Thus, it is not necessary that the remote controller 4 in the second embodiment has a delay function which, on the other hand, is important to the discharge controller 3 in the first embodiment of FIG. 1.

An operating mode of the apparatus in the second embodiment shown in FIG. 2 will be described with reference to the timing diagram of FIG. 4. When the discharge is continued to the point where the battery voltage is lower than the discharge finishing voltage VL, the voltage detector 2 is driven to transmit the discharge finishing signal PFD to thereby require the external apparatuses and instruments to stop the power supply.

On the other hand, the external apparatuses and instruments Z always monitor the battery state by the discharge finishing signal PFD. When the external apparatuses and instruments recognize the discharge-finish of the battery B, a predetermined stop operation (data-save operation, etc.) is executed and thereafter a power cut-out signal RST is transmitted to the battery, package. When the power cut-out signal RST is input to the remote controller 4, an OFF output signal S1 is output from the output side to the switching portion 1 so that the power supply to the external apparatuses and instruments Z is stopped.

In the second embodiment of the invention, the, cut-out timing of the output after the over-discharge detection can be controlled by the external apparatuses and instruments Z and a suitable stopping operation period Td in accordance with the external apparatuses and instruments can be obtained as desired. Thus, a serious problem of system-shutdown in a network system such as personal computers, work stations, etc. can be prevented thereby improving the reliability of the entire system.

Figure 3:
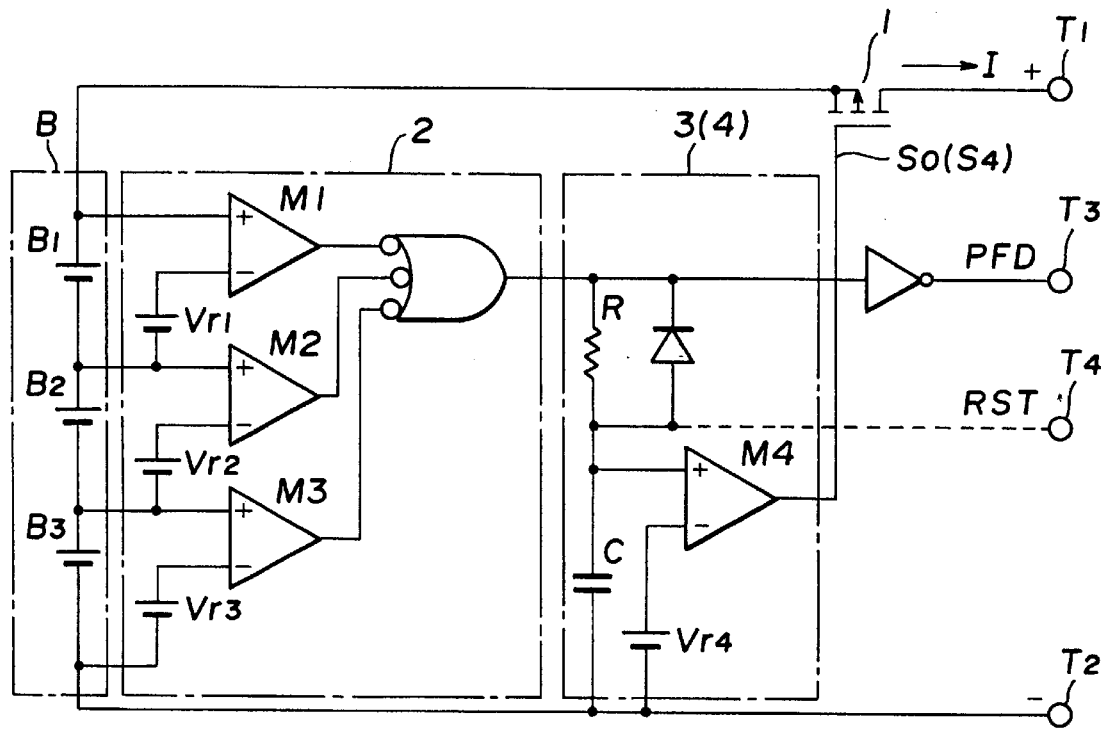
FIG. 3 is a block diagram of a specific structure of an electric circuit of the over-discharge prevention apparatus of the present invention.

With reference to FIG. 3 which shows a specific electric circuit, a battery package has therein a battery B composed of three cells B1, B2, and B3 which are connected together in series. In FIG. 3, a switching portion 1 for cutting off the battery output is composed of a MOS-FET., The battery detector 2 is composed of comparators M1, M2, M3, for separately detecting the voltages of the battery cells B1, B2, B3, and an output side of the logical OR gate is connected with the discharge controller 3 of the next stage as an output of the voltage detector 2 and also connected with the terminal T3 as a conductive wire for the discharge finishing signal PFD. Reference voltages Vr1, Vr2, Vr3 of the comparators M1, M2, M3 are set in accordance with discharge finishing voltages of the battery cells B1, B2 and B3.

The discharge controller 3 has a charge circuit which is composed of capacitor C connected to the output side of the voltage detector 2 and a resistor R, and a delay circuit composed of a comparator M4 which has a predetermined reference voltage as a negative (−) input. The output line thereof is connected with a gate of the MOS-FET of the next stage.

In the illustrated embodiment of FIG. 3, the voltage detector 2 and the discharge controller 3 (delay circuit) is customized into an integrated circuit to comply with a small size requirement, and a capacitor is additionally affixed outside the integrated circuit in order for a delay time, determined by a time constant of the capacitor C and the resistor R, to be set timely. This structure shown in FIG. 3 is a specific structure of the first embodiment shown in FIG. 1 and, similarly, the specific-structure of the second embodiment shown in FIG. 2 can be realized by connecting a connecting terminal of the externally fitted capacitor C to the terminal T4 as an input terminal for the power source cutting out signal RST as shown by dotted line in FIG. 3, so that an interactive system which is a feature of the second embodiment can be realized. In other words, if the power cutting out signal RST is maintained at a "L" (low) state even if the discharge finishing signal PFD is transmitted by the over-discharge detection, the delay circuit is not driven since charging operation of the capacitor C is not started even though the output of the voltage detector 2 is of a "H" (high) state and, therefore, the battery output is not cut out. As the power cutting out signal RST is changed to the "H" state, charging operation starts, and the output of the comparator M4 changes from "L" state to "H" state after the time constant of the capacitor C and the resistor R, so that the MOS-FET becomes an OFF state to thereby cut off the battery output. At this moment, if the delay time after the power cut-out signal RST is received is not required, the capacitor C can be of a small scale or otherwise deleted.

In the remote controller 4 of the second embodiment of the invention shown in FIG. 2, a delay circuit of the comparator M4 is used, but the present invention is not limited to this structure, but rather any desired structure can be applied provided that the MOS-FET which forms the switching portion 1 can be set to an OFF state by means of the power cutting signal RST from the outside after the discharge finishing signal PFD is transmitted. Further, the over-discharge prevention apparatus is applied to not only the secondary batteries but also to the primary batteries such as manganese dry cells and alkaline dry cells, etc., large scaled batteries and accumulators and various kinds of batteries and accumulator elements in which an output voltage changes in accordance with a remaining capacity of such batteries and so forth.

According to the present invention, a discharge finishing signal is transmitted when the accumulation elements such as batteries are in a discharge end state (discharge extinction voltage) and the discharge is stopped after a predetermined period of time. Thus, if this is applied to external apparatuses and instruments as a power source, processing data and information can be protected before the power supply is stopped and other suitable and necessary emergency processing can be executed to thereby improve the safety and reliability of the data in the external apparatuses and instruments.

Further, the power source detection mechanisms which have been required in the external apparatuses and instruments of the conventional apparatus are not required any more in the present invention. Thus, since voltage detection margins are not required, the remaining capacity of the battery cells can be obtained to a maximum extent. Additionally, in the present invention the discharge is stopped when a power cut-out signal is received after a discharge finishing signal is transmitted and, therefore, the period of time from over-discharge detection to stop of discharge can be controlled freely by the external apparatus and instruments. Consequently, especially in a network system using personal computers or workstations, serious problems of system-shutdown can be prevented by a suitable power cutting-out sequence, so that the reliability of the entire system can be improved.

What is claimed is:

1. An over-discharge prevention apparatus for an external apparatus, comprising:

voltage detection means for detecting electric voltages of each battery cell of a multi-cell structure forming a battery package, said voltage detection means obtaining a logical sum of the detected electric voltages when a discharge finishing voltage is detected to transmit a discharge finishing signal (PFD) for the battery package to the external apparatus;

discharge controlling means for delaying a detected output of the voltage detection means for a predetermined time (Td); and switching means connected in series with the battery package, the switching means being set to an OFF state by a delay signal of the discharge controlling means after the discharge finishing signal is transmitted to the external apparatus.

2. An over-discharge prevention apparatus for an external apparatus, comprising:

voltage detection means for detecting electric voltages of each battery cell of a multi-cell structure forming a battery package, said voltage detection means obtaining a logical sum of the detected electric voltages when a discharge finishing voltage is detected to transmit a discharge finishing signal (PFD) for the battery package to the external apparatus;

remote controlling means for effectuating an external power cut-off signal (RST) after the discharge finishing signal (PFD) is transmitted; and switching means connected in series with the battery package, the switching means being set to an OFF state by an OFF output signal (S1) of the remote controlling means after the discharge finishing signal is transmitted to the external apparatus.

* * * * *